(12) United States Patent
Kuttumukkula Chandrasekaran et al.

(10) Patent No.: US 11,608,003 B2
(45) Date of Patent: Mar. 21, 2023

(54) VEHICULAR STORAGE ARRANGEMENT

(71) Applicant: Toyota Motor Engineering & Manufacturing North America, Inc., Plano, TX (US)

(72) Inventors: Sathya Shankar Kuttumukkula Chandrasekaran, Novi, MI (US); Robert J. Hazlewood, Plymouth, MI (US); Vikas Bhatia, South Lyon, MI (US); Patrick J. Edgar, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 232 days.

(21) Appl. No.: 17/162,238

(22) Filed: Jan. 29, 2021

(65) Prior Publication Data

US 2022/0242324 A1 Aug. 4, 2022

(51) Int. Cl.
*B60R 7/04* (2006.01)
*B60N 2/30* (2006.01)

(52) U.S. Cl.
CPC .............. *B60R 7/043* (2013.01); *B60N 2/305* (2013.01)

(58) Field of Classification Search
CPC ........... B60R 7/043; B60R 7/02; B60R 5/045; B60N 2/305; B64D 11/0627; B64D 11/0636; B64D 11/003; B65D 25/06

USPC .................................................. 296/37.15, 63
See application file for complete search history.

(56) References Cited

U.S. PATENT DOCUMENTS

| | | | |
|---|---|---|---|
| 5,551,616 A * | 9/1996 | Stitt ........................ | B60R 7/043 224/539 |
| 9,981,778 B2 * | 5/2018 | Plattner .................. | B65D 25/06 |
| 2004/0149791 A1 * | 8/2004 | Tuel, Jr. .................. | B60R 7/043 224/42.11 |
| 2006/0181103 A1 | 8/2006 | Khan et al. | |
| 2008/0128428 A1 * | 6/2008 | Beckerman ............ | B65D 25/06 220/532 |
| 2018/0148221 A1 * | 5/2018 | Hill ........................ | B65D 25/06 |
| 2018/0371685 A1 * | 12/2018 | Ausi ...................... | B65D 25/06 |
| 2019/0184904 A1 * | 6/2019 | Fang ...................... | B65D 25/06 |
| 2019/0210538 A1 | 7/2019 | Adrian | |
| 2020/0023782 A1 * | 1/2020 | Gill ........................ | B60R 7/043 |

* cited by examiner

*Primary Examiner* — Jason S Morrow
*Assistant Examiner* — Wenwei Zhuo
(74) *Attorney, Agent, or Firm* — Christopher G. Darrow; Darrow Mustafa PC

(57) ABSTRACT

A vehicular storage arrangement includes a storage compartment, a resiliently normally bendable divider for dividing the storage compartment, and a mount for the divider in the storage compartment. The mount is configured to make slidable peripheral engagement with the divider, under which the mount is configured to support the divider in a mounted position, and urge the divider to normally bend in the mounted position, thereby tightening the slidable peripheral engagement.

12 Claims, 2 Drawing Sheets

VEHICULAR STORAGE ARRANGEMENT

TECHNICAL FIELD

The embodiments disclosed herein relate to vehicles and, more particularly, vehicles with storage arrangements.

BACKGROUND

Outfitting vehicles with storage arrangements has long been a focus of automotive design. In addition to storage compartments, storage arrangements are known to include dividers for dividing the storage compartments, and mounts for the dividers in the storage compartments. In these storage arrangements, the mounts, from their locations in the storage compartment, are configured to mount the dividers.

In slide-in implementations, the mounts are configured to make slidable peripheral engagement with the dividers, and mount the dividers thereunder. In relation to the mounts mounting the dividers thereunder, the slidable peripheral engagement raises a conflict between anti-rattling and ease-of-use, in which the slidable peripheral engagement, while promoting anti-rattling when tight, promotes ease-of-use when loose.

SUMMARY

Disclosed herein are embodiments of a vehicular storage arrangement. In one aspect, the vehicular storage arrangement includes a storage compartment, a resiliently normally bendable divider for dividing the storage compartment, and a mount for the divider in the storage compartment. The mount is configured to make slidable peripheral engagement with the divider, under which the mount is configured to support the divider in a mounted position, and urge the divider to normally bend in the mounted position, thereby tightening the slidable peripheral engagement. This and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicular storage arrangement that, among other things, includes a storage compartment, dividers for dividing the storage compartment, and mounts for the dividers in the storage compartment. In slide-in implementations, the mounts are configured to make slidable peripheral engagement with the dividers, and mount the dividers thereunder. Specifically, under the slidable peripheral engagement, from unmounted positions, the mounts are configured to support the dividers for user-based inward movement to mounted positions through pre-mounted positions and near-mounted positions.

To resolve a conflict between anti-rattling and ease-of-use, in which the slidable peripheral engagement, while promoting anti-rattling when tight, promotes ease-of-use when loose, the slidable peripheral engagement is untightened with user-based inward movement of the dividers from the pre-mounted positions to the near-mounted positions, and tightens with user-based inward movement of the dividers from the near-mounted positions to the mounted positions. Specifically, with the dividers being resiliently normally bendable, under the slidable peripheral engagement, from the pre-mounted positions to the near-mounted positions, the mounts are configured to leave the dividers normally unbent, thereby leaving the slidable peripheral engagement untightened. However, from the near-mounted positions to the mounted positions, the mounts are configured to urge the dividers to normally bend, thereby tightening the slidable peripheral engagement.

Figure 1:
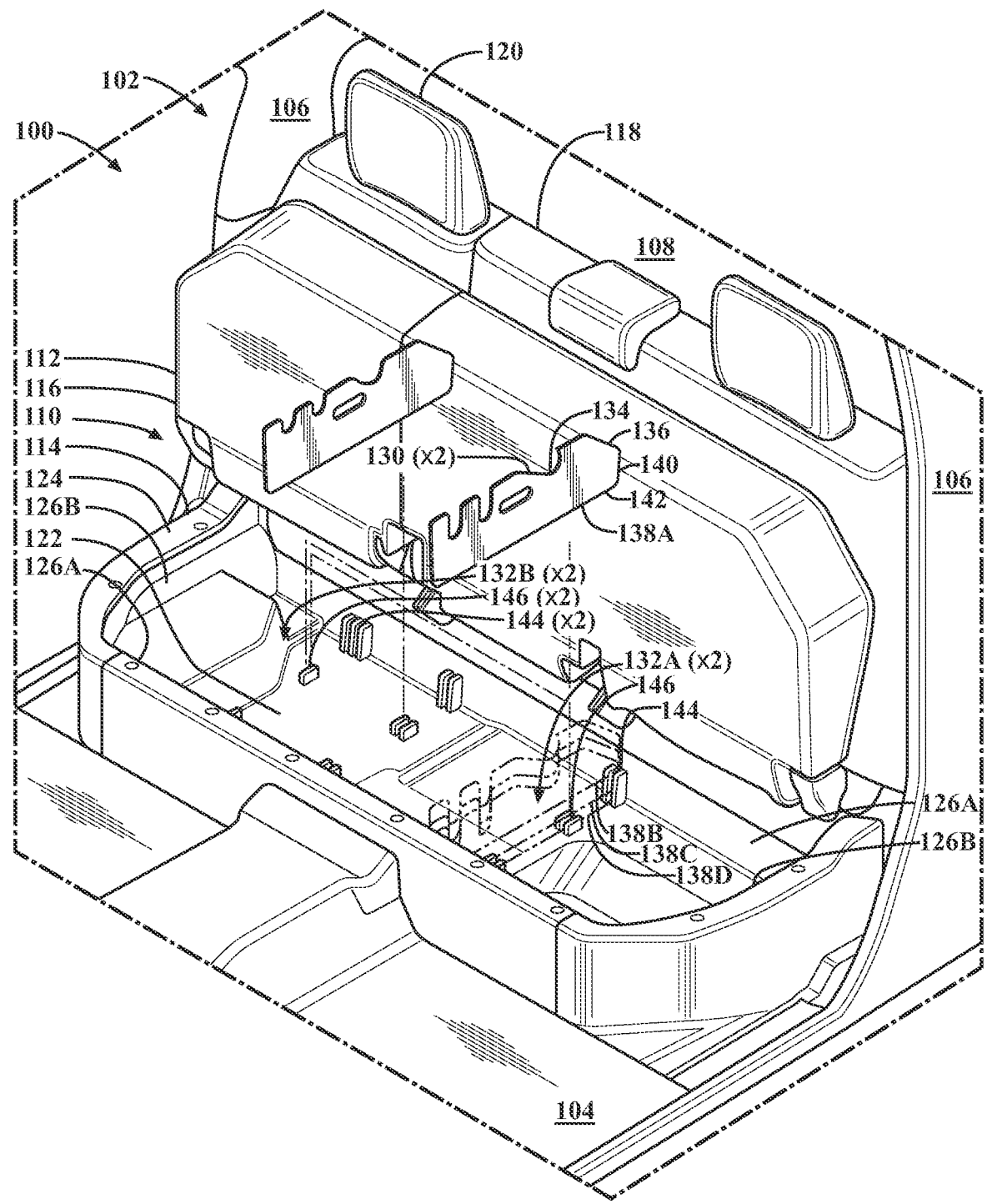
FIG. 1 is a perspective view of a vehicle with a side partially broken away to reveal a passenger compartment, showing a storage arrangement that includes a seat, a storage compartment under the seat, dividers for dividing the storage compartment, and mounts for the dividers in the storage compartment, as well as aspects of the mounts making slidable peripheral engagement with the dividers, and mounting the dividers thereunder.

Part of a representative passenger vehicle 100 is shown in FIG. 1. In this description, uses of "front," "forward" and the like, and uses of "rear," "rearward" and the like, refer to the longitudinal direction of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral direction of the vehicle 100, with "driver side" and the like referring to the left side of the vehicle 100, and "passenger side" and the like referring to the right side of the vehicle 100.

As shown, the vehicle 100 is a pickup truck. The vehicle 100 includes an exterior and a number of interior compartments. The compartments include a passenger compartment 102, as shown, as well as an engine compartment and, in the illustrated pickup truck configuration of the vehicle 100, an open-topped bed for carrying cargo.

The vehicle 100 includes a body that forms the exterior and defines or otherwise encloses the compartments. In relation to the passenger compartment 102, the body includes a floor 104, opposed sides 106 and a partition 108, as shown, as well as a roof and the like. The vehicle 100 includes seats, a dash assembly, an instrument panel, controls and the like housed in the passenger compartment 102. Moreover, the vehicle 100 includes an engine, a motor, a transmission and the like, as well as other powertrain components, such as wheels, housed, in whole or in part, in any combination of the body, the engine compartment and elsewhere in the vehicle 100. The wheels support the remainder of the vehicle 100 on the ground. One, some or all of the wheels are powered by the remainder of the powertrain components to drive the vehicle 100 along the ground.

For purposes of accommodating both seated passengers and cargo, the vehicle 100 includes a storage arrangement 110 housed in the passenger compartment 102. The storage arrangement 110 includes a seat 112 above the floor 104 for supporting seated passengers, and an open-topped storage compartment 114 on the floor 104 under the seat 112 for carrying cargo. Although the seat 112, as shown, is a second-row bench seat backed against the partition 108, it will be understood that this disclosure is applicable in principle to otherwise similar vehicular storage arrangements including otherwise similar seats, including other rear seats (e.g., third-row seats), front seats (e.g., driver seats and passenger seats), and other types of seats (e.g., bucket seats). Moreover, although the storage compartment 114, as shown, in an under-seat implementation, is under the seat 112, it will be understood that this disclosure is applicable in principle to otherwise similar vehicular storage arrangements including standalone storage compartments.

The seat 112 includes a shared seat bottom 116 atop the storage compartment 114, a shared seatback 118 atop the seat bottom 116, and individual headrests 120 atop the seatback 118. As part of the storage arrangement 110, the storage compartment 114, from its location thereunder, serves as a base for the seat 112, and the seat bottom 116, from its location thereatop, serves as a lid-type closure for the storage compartment 114. Specifically, the seat bottom 116 is pivotally movable, relative to the storage compartment 114, between a closed (or "down") position and an open (or "up") position. In the closed position, the seat bottom 116 is positioned over the storage compartment 114, and rests on the storage compartment 114. With the seat bottom 116 in the closed position and resting on the storage compartment 114, the seat 112 has a passenger carrying configuration, in which the seat bottom 116, the seatback 118 and the headrests 120 are configured to support seated passengers. In FIG. 1, the seat bottom 116 is shown in the open position. In the open position, the seat bottom 116 is positioned away from the storage compartment 114, which allows access to the storage compartment 114 from the top.

With the seat bottom 116 in the closed position, the seat 112 and the storage compartment 114 share a footprint that extends longitudinally from the partition 108, and laterally between the sides 106. The storage compartment 114 includes a bottom 122 and a wall 124 atop the bottom 122. The bottom 122, and the storage compartment 114 to which the bottom 122 belongs, rest on the floor 104 under the seat 112, and the storage compartment 114 is mounted to the floor 104 under the seat 112 at the bottom 122. The bottom 122 is horizontal, and extends longitudinally from the partition 108, and laterally between the sides 106. The wall 124 is upright, and includes a number of wall sections 126 that extend vertically from the bottom 122 in a closed loop therearound. As shown, the wall 124 includes opposed front and rear wall sections 126A that extend laterally between the sides 106, and opposed adjacent side wall sections 126B that extend longitudinally from the partition 108 along the sides 106. With the seat bottom 116 in the closed position and resting on the storage compartment 114, the seat bottom 116 engages the wall 124. Specifically, the seat bottom 116 engages the front wall section 126A, and the adjacent side wall sections 126B.

With a footprint shared with the seat 112, the storage compartment 114 is sizable. Likewise, the storage compartment 114 is configured to carry various cargo, including both large cargo and small cargo. For purposes of selectively configuring the storage compartment 114 to carry both small cargo and large cargo, the storage arrangement 110 includes one or more dividers 130 for dividing the storage compartment 114, and one or more mounts 132 for the dividers 130 in the storage compartment 114 (partially viewable in FIG. 1 behind the front wall section 126A, with the unviewable parts being mirror images). Although the storage arrangement 110, as shown, includes two dividers 130, it will be understood that this disclosure is applicable in principle to otherwise similar vehicular storage arrangements including one divider 130, as well as otherwise similar vehicular storage arrangements otherwise including multiple dividers 130. Moreover, although the storage arrangement 110, as shown, includes four mounts 132, it will be understood that this disclosure is applicable in principle to otherwise similar vehicular storage arrangements including one mount 132, as well as otherwise similar vehicular storage arrangements otherwise including multiple mounts 132.

Using the mounts 132, the dividers 130 are mountable (and un-mountable and re-mountable) in the storage compartment 114. Specifically, the mounts 132, from their locations in the storage compartment 114, are configured to mount (and unmount and remount) the dividers 130. The dividers 130, when mounted thereto, are oriented in the storage compartment 114 with the mounts 132. As shown, with the open-topped configuration of the storage compartment 114, the mounts 132 are upright, and oriented across the storage compartment 114, to mount the dividers 130 from the top. Likewise, when mounted to the mounts 132, the dividers 130 are upright, and extend across the storage compartment 114. Although the mounts 132, as shown, are oriented across the storage compartment 114 between the front and rear wall sections 126A, it will be understood that this disclosure is applicable in principle to otherwise similar vehicular storage arrangements in which the mounts 132 are otherwise oriented across the storage compartment 114 between opposed wall sections 126, including between the adjacent side wall sections 126B.

As shown, the storage arrangement 110 includes two mounts 132 per divider 130. Specifically, for each divider 130, the storage arrangement 110 includes a utilization mount 132A for utilizing the divider 130, and a stowage mount 132B for stowing the divider 130. The utilization mounts 132A are oriented across the storage compartment 114 toward the middle thereof. Specifically, the utilization mounts 132A are oriented across the storage compartment 114 between the front and rear wall sections 126A away from the adjacent side wall sections 126B. When mounted to the utilization mounts 132A, the dividers 130, extending across the storage compartment 114 toward the middle thereof, are utilized to divide the storage compartment 114, thereby configuring the storage compartment 114 to carry small cargo. The stowage mounts 132B are oriented across the storage compartment 114 toward the wall 124. Specifically, the stowage mounts 132B are oriented across the storage compartment 114 between the front and rear wall sections 126A alongside one of the adjacent side wall sections 126B. When mounted to the stowage mounts 132B, the dividers 130, extending across the storage compartment 114 toward the wall 124, are stowed to leave the storage compartment 114 substantially undivided, thereby configuring the storage compartment 114 to carry large cargo.

For brevity, this description follows with reference to the mounts 132 mounting the dividers 130. However, it will be understood that this disclosure is applicable in principle to the mounts 132 unmounting and remounting the dividers 130. As shown, the dividers 130 include board-like main bodies 134 and peripheries 136 therearound. For purposes of mounting the dividers 130, the mounts 132, in slide-in implementations, are complementary to the peripheries 136. With their complementation to the peripheries 136, the mounts 132, as part of mounting the dividers 130, are configured to make slidable peripheral engagement with the dividers 130 or, in other words, sliding or otherwise slidable engagement with the peripheries 136. Although the mounts 132, as shown, have female-to-male complementation to the peripheries 136, and are configured to make female-to-male slidable peripheral engagement with the dividers 130, it will be understood that this disclosure is applicable in principle to otherwise similar vehicular storage arrangements in which the mounts 132 have male-to-female complementation to the peripheries 136, and are configured to make male-to-female slidable peripheral engagement with the dividers 130.

In relation to making the slidable peripheral engagement with the dividers 130, the mounts 132 are configured to mount the dividers 130 thereunder. Specifically, under the slidable peripheral engagement, from unmounted positions 138A (illustrated in FIG. 1 with solid lines), in which the dividers 130 are unmounted from the mounts 132, the mounts 132 are configured to support the dividers 130 for user-based inward movement, relative to the mounts 132, and the storage compartment 114 in which the mounts 132 are located, to mounted positions 138D, in which the dividers 130 are mounted to the mounts 132, through pre-mounted positions 138B and near-mounted positions 138C (illustrated for a representative divider 130 in FIG. 1 with phantom lines).

In relation to the mounts 132 mounting the dividers 130 thereunder, the slidable peripheral engagement raises a conflict between two features important to the perceived quality of the vehicle 100, anti-rattling and ease-of-use. In particular, the slidable peripheral engagement, while promoting anti-rattling when tight, promotes ease-of-use when loose. Specifically, under the slidable peripheral engagement, in addition to mounting the dividers 130, the mounts 132 are configured to frictionally hold the dividers 130 in the mounted positions 138D. With respect to promoting anti-rattling, when the slidable peripheral engagement is tight, the mounts 132 will inhibit vibratory movement of the dividers 130, including any combination of vibratory inward and outward movement, vibratory normal movement and vibratory sideways movement, about the mounted positions 138D. At the same time, in association with mounting the dividers 130, the mounts 132 are configured to frictionally oppose inward movement of the dividers 130 from the pre-mounted positions 138B to the mounted positions 138D. With respect to promoting ease-of-use, when the slidable peripheral engagement is loose, the mounts 132 will not unduly impede user-based inward movement of the dividers 130 from the pre-mounted positions 138B to the mounted positions 138D.

One conceptually straightforward way to resolve the conflict between anti-rattling and ease-of-use is configuring the mounts 132 to make the slidable peripheral engagement with the dividers 130 with an interference fit. When made with an interference fit, the slidable peripheral engagement might be tight enough to promote anti-rattling, but loose enough to promote ease-of-use. However, an interference fit might be unforgiving. Specifically, if exacting tolerances are not met, the slidable peripheral engagement might be either too loose, to the point of undermining anti-rattling, or too tight, to the point of undermining ease-of-use. Likewise, in association with meeting exacting tolerances, an interference fit might create drawbacks in terms of manufacturability, cost and the like. Moreover, even if exacting tolerances are met, an interference fit might induce either the mounts 132 or the peripheries 136, or both, to creep as the mounts 132 repeatedly mount, unmount and remount the dividers 130, resulting in the slidable peripheral engagement untightening and, over time, becoming too loose, to the point of undermining anti-rattling.

Figure 2A:
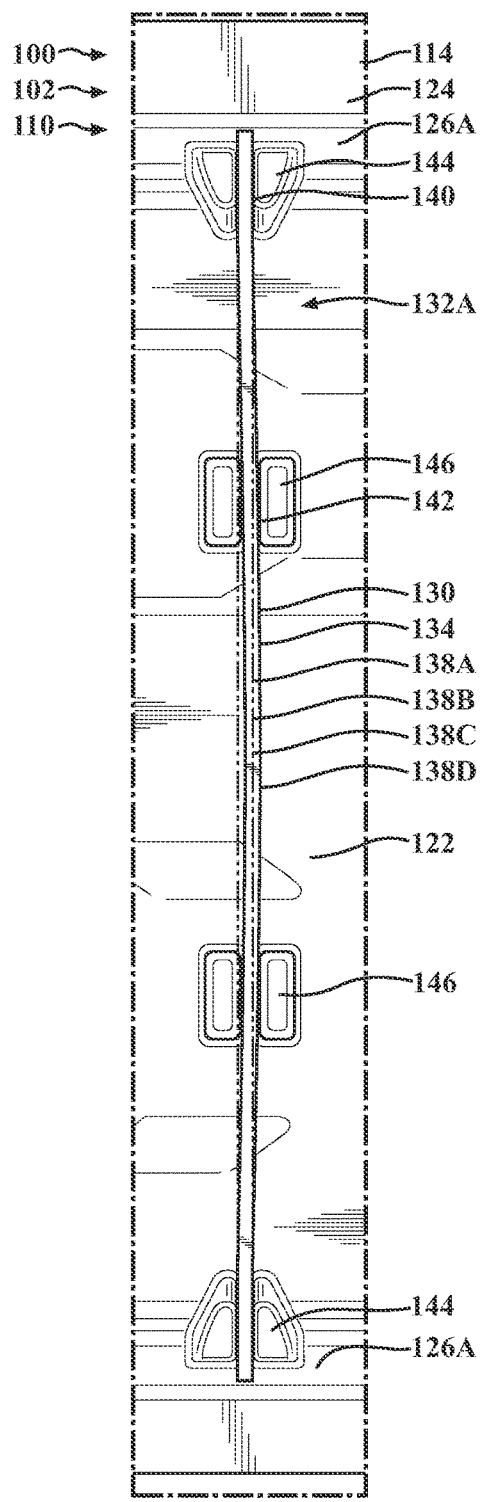
FIGS. 2A and 2B are top views of the storage arrangement, showing further aspects of the mounts mounting the dividers under the slidable peripheral engagement, including the mounts urging the dividers to normally bend, thereby tightening the slidable peripheral engagement.
Figure 2B:
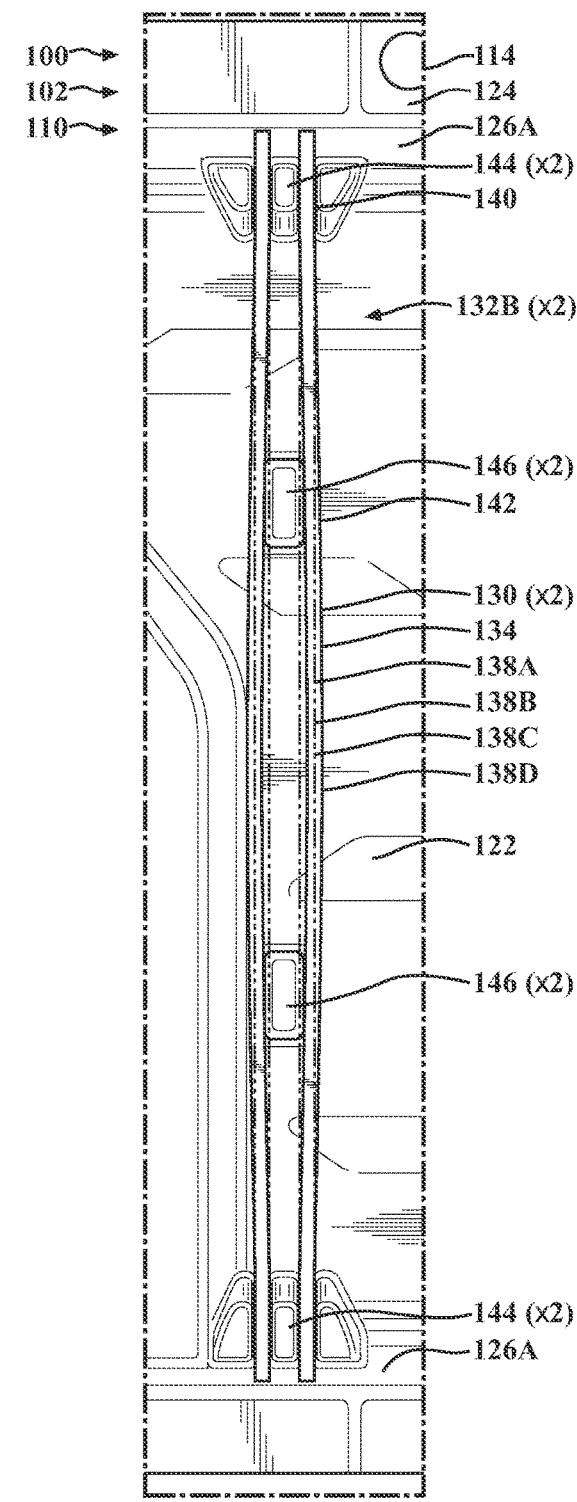

As shown with additional reference to FIGS. 2A and 2B, to resolve the conflict between anti-rattling and ease-of-use without the need for an interference fit, the mounts 132 are configured to make position-dependent variable-tightness slidable peripheral engagement with the dividers 130. Specifically, to promote ease-of-use, the slidable peripheral engagement is untightened with user-based inward movement of the dividers 130 from the pre-mounted positions 138B to the near-mounted positions 138C. However, to promote anti-rattling, the slidable peripheral engagement tightens with user-based inward movement of the dividers 130 from the near-mounted positions 138C to the mounted positions 138D.

In relation to the slidable peripheral engagement, the dividers 130 are resiliently normally bendable. Specifically, when normally unbent (illustrated in FIGS. 2A and 2B with phantom lines), the dividers 130 are subject to being urged to normally bend (illustrated in FIGS. 2A and 2B with solid lines), whereupon the dividers 130 have resilient biases for return normal unbending. Although the dividers 130, as shown, have flattened shapes when normally unbent and curved shapes when normally bent, it will be understood that this disclosure is applicable in principle to otherwise similar vehicular storage arrangements in which the dividers 130 have curved shapes when normally unbent and flattened shapes when normally bent.

Under the slidable peripheral engagement, from the pre-mounted positions 138B to the near-mounted positions 138C, the mounts 132 are configured to leave the dividers 130 normally unbent. With the dividers 130 normally unbent, the peripheries 136 do not normally react against the mounts 132. Absent the peripheries 136 normally reacting against the mounts 132, the slidable peripheral engagement is left untightened. However, from the near-mounted positions 138C to the mounted positions 138D, the mounts 132 are configured to urge the dividers 130 to normally bend. With the dividers 130 normally bent, under the resilient biases thereof for return normal unbending, the peripheries 136 normally react against the mounts 132. With the peripheries 136 normally reacting against the mounts 132, the slidable peripheral engagement is tightened.

With the position-dependent variable-tightness slidable peripheral engagement resolving the conflict between anti-rattling and ease-of-use, there is no need to configure the mounts 132 to make the slidable peripheral engagement with the dividers 130 with an interference fit. Instead, the mounts 132 may be configured to make the slidable peripheral engagement with the dividers 130 with a transition fit (also known as a "contact" or "net" fit) or otherwise without an interference fit. As opposed to an interference fit, a transition fit is forgiving, and does not create drawbacks in terms of manufacturability, cost and the like. Moreover, a transition fit will not induce either the mounts 132 or the peripheries 136 to creep as the mounts 132 repeatedly mount, unmount and remount the dividers 130.

As shown, along the peripheries 136, the dividers 130 include opposed sides 140 and a base 142 between the sides 140. With the mounts 132 oriented across the storage compartment 114 therebetween, the mounts 132 include opposed side supports 144 on the front and rear wall sections 126A. The side supports 144 are complementary to the sides 140. With their complementation to the sides 140, the side supports 144, as part of the mounts 132 to which the side supports 144 belong making the slidable peripheral engagement therewith, are configured to make slidable side engagement with the dividers 130 or, in other words, sliding or otherwise slidable engagement with the sides 140. In addition to the side supports 144, the mounts 132 include one or more base supports 146 between the side supports 144 on the bottom 122. The base supports 146 are complementary to the bases 142. With their complementation to the bases 142, the base supports 146, as part of the mounts 132 to which the base supports 146 belong making the slidable peripheral engagement therewith, are configured to make slidable base engagement with the dividers 130 or, in other words, sliding or otherwise slidable engagement with the bases 142. Although the mounts 132, as shown, include two spaced base supports 146, it will be understood that this disclosure is applicable in principle to otherwise similar vehicular storage arrangements in which the mounts 132 include one base support 146, as well as otherwise similar vehicular storage arrangements in which the mounts 132 otherwise include multiple base supports 146.

As shown with combined reference to FIG. 1 and FIGS. 2A and 2B, in conjunction with user-based inward movement of the dividers 130 from the pre-mounted positions 138B to the mounted positions 138D, with the dividers 130 approaching the pre-mounted positions 138B, the sides 140 meet the side supports 144. Commencing with the pre-mounted positions 138B, the slidable peripheral engagement includes the slidable side engagement. From the pre-mounted positions 138B to the mounted positions 138D through the near-mounted positions 138C, under the slidable side engagement, the side supports 144 are configured to support the dividers 130 bidirectionally against normal movement. With respect to their complementation to the sides 140, the side supports 144 are configured to support the dividers 130 bidirectionally against normal movement without independently urging the dividers 130 to normally bend. Moreover, the side supports 144 are configured to support the dividers 130 bidirectionally against sideways movement about the pre-mounted positions 138B, the near-mounted positions 138C and the mounted positions 138D.

With the dividers 130 approaching the near-mounted positions 138C, the bases 142 meet the base supports 146. Commencing with the near-mounted positions 138C, the slidable peripheral engagement, in addition to the slidable side engagement, includes the slidable base engagement. From the near-mounted positions 138C to the mounted positions 138D, under the slidable base engagement, the base supports 146 are configured to support the dividers 130 bidirectionally or otherwise at least unidirectionally against normal movement. With respect to their complementation to the bases 142, the base supports 146 are configured to support the dividers 130 at least unidirectionally against normal movement without independently urging the dividers 130 to normally bend. Moreover, culminating with the mounted positions 138D, the bases 142 bottom out against the base supports 146. With the bases 142 bottoming out thereagainst, the base supports 146 are configured to support the dividers 130 unidirectionally against inward movement past the mounted positions 138D.

In the mounts 132, the base supports 146, although otherwise located between the side supports 144, are normally offset therefrom. For instance, the base supports 146 may be normally offset from the side supports 144 between approximately 3 mm and 10 mm inclusive. From the near-mounted positions 138C to the mounted positions 138D, under the slidable base engagement, the base supports 146, from their locations between but normally offset from the side supports 144, as part of supporting the dividers 130 at least unidirectionally against normal movement, are configured to normally deflect the bases 142 away from the side supports 144. With the normal deflection of the bases 142 propagating throughout the dividers 130, the base supports 146 are configured to normally deflect the dividers 130 away from the side supports 144. At the same time, under the slidable side engagement, the side supports 144, as part of supporting the dividers 130 bidirectionally against normal movement, are configured to counteractively support the dividers 130 against normal deflection away from the side supports 144. With the base supports 146 normally deflecting the dividers 130 away from the side supports 144 in the face of the side supports 144 counteractively supporting the dividers 130 against normal deflection away from the side supports 144, the base supports 146 are configured to urge the dividers 130 to normally bend.

Accordingly, from the pre-mounted positions 138B to the mounted positions 138D, under the single-component slidable peripheral engagement, including only the slidable side engagement, the mounts 132, using only the side supports 144, are configured to leave the dividers 130 normally unbent. However, under the two-component slidable peripheral engagement, including the combination of the slidable side engagement and the slidable base engagement, the mounts 132, using the combination of the side supports 144 and the base supports 146, are configured to urge the dividers 130 to normally bend.

The storage compartment 114 has a molded or otherwise unitarily formed construction. Likewise, the storage compartment 114 may be made from one or more high-strength and durable polymeric materials suitable for molding. As shown, the mounts 132 are unitarily formed with the storage compartment 114. Specifically, the side supports 144 are unitarily formed with the front and rear wall sections 126A, and the base supports 146 are unitarily formed with the bottom 122. As shown with combined reference to FIG. 1 and FIG. 2A, the utilization mounts 132A are formed individually as opposed pairs of side ridges and opposed side valleys between the pairs of side ridges defining the side supports 144, and spaced pairs of base ridges and spaced base valleys between the pairs of base ridges defining the base supports 146. As shown with combined reference to FIG. 1 and FIG. 2B, the stowage mounts 132B are formed together as opposed trios of side ridges and opposed pairs of side valleys between the trios of side ridges defining the side supports 144, and spaced base ridges and spaced base valleys on either side of the base ridges defining the base supports 146. From the perspective of each stowage mount 132B, the stowage mounts 132B are formed as opposed pairs of side ridges and opposed side valleys between the pairs of side ridges defining the side supports 144, and spaced base ridges and spaced base valleys on one side of the base ridges defining the base supports 146.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicular storage arrangement, comprising:
a storage compartment;
a resiliently normally bendable divider for dividing the storage compartment; and
a mount for the divider in the storage compartment, the mount configured to make slidable peripheral engagement with the divider, under which the mount is configured to support the divider in a mounted position, and urge the divider to normally bend in the mounted position, thereby tightening the slidable peripheral engagement.

2. The vehicular storage arrangement of claim 1, wherein:
the divider includes opposed sides and a base between the sides;
the mount includes opposed side supports and a base support between the side supports, the side supports configured to make slidable side engagement with the divider in the mounted position, and the base support configured to make slidable base engagement with the divider in the mounted position; and
the base support is normally offset from the side supports, and configured, under the slidable base engagement, to normally deflect the divider away from the side supports in the face of the side supports, under the slidable side engagement, counteractively supporting the divider against normal deflection away from the side supports, thereby urging the divider to normally bend.

3. The vehicular storage arrangement of claim 1, wherein under the slidable peripheral engagement, the mount is configured to support the divider for user-based inward movement to the mounted position through a pre-mounted position and a near-mounted position, leave the divider normally unbent from the pre-mounted position to the near-mounted position, thereby leaving the slidable peripheral engagement untightened, and urge the divider to normally bend from the near-mounted position to the mounted position, thereby tightening the slidable peripheral engagement.

4. The vehicular storage arrangement of claim 3, wherein:
the divider includes opposed sides and a base between the sides;
the mount includes opposed side supports and a base support between the side supports, the side supports configured to make slidable side engagement with the divider from the pre-mounted position to the mounted position through the near-mounted position without independently urging the divider to normally bend, and the base support configured to make slidable base engagement with the divider from the near-mounted position to the mounted position without independently urging the divider to normally bend; and
the base support is normally offset from the side supports, and configured, under the slidable base engagement, to normally deflect the divider away from the side supports in the face of the side supports, under the slidable side engagement, counteractively supporting the divider against normal deflection away from the side supports, thereby urging the divider to normally bend.

5. The vehicular storage arrangement of claim 1, wherein the mount is configured to make the slidable peripheral engagement with the divider without an interference fit.

6. The vehicular storage arrangement of claim 1, wherein the mount is configured to make the slidable peripheral engagement with the divider with a transition fit.

7. The vehicular storage arrangement of claim 1, wherein the mount is unitarily formed with the storage compartment.

8. The vehicular storage arrangement of claim 2, wherein the mount is unitarily formed with the storage compartment as an opposed pair of side ridges and opposed side valleys between the pair of side ridges defining the side supports, and a pair of base ridges and a base valley between the pair of base ridges defining the base support.

9. The vehicular storage arrangement of claim 4, wherein the mount is unitarily formed with the storage compartment as an opposed pair of side ridges and opposed side valleys between the pair of side ridges defining the side supports, and a pair of base ridges and a base valley between the pair of base ridges defining the base support.

10. The vehicular storage arrangement of claim 2, wherein the mount is formed as an opposed pair of side ridges and opposed side valleys between the pair of side ridges defining the side supports, and a base ridge and a base valley on one side of the base ridge defining the base support.

11. The vehicular storage arrangement of claim 4, wherein the mount is formed as an opposed pair of side ridges and opposed side valleys between the pair of side ridges defining the side supports, and a base ridge and a base valley on one side of the base ridge defining the base support.

12. The vehicular storage arrangement of claim 1, further comprising:
a seat, the seat including a seat bottom atop the storage compartment, the seat bottom pivotally movable between a closed position over the storage compartment and an open position away from the storage compartment.

* * * * *